Figure 1:
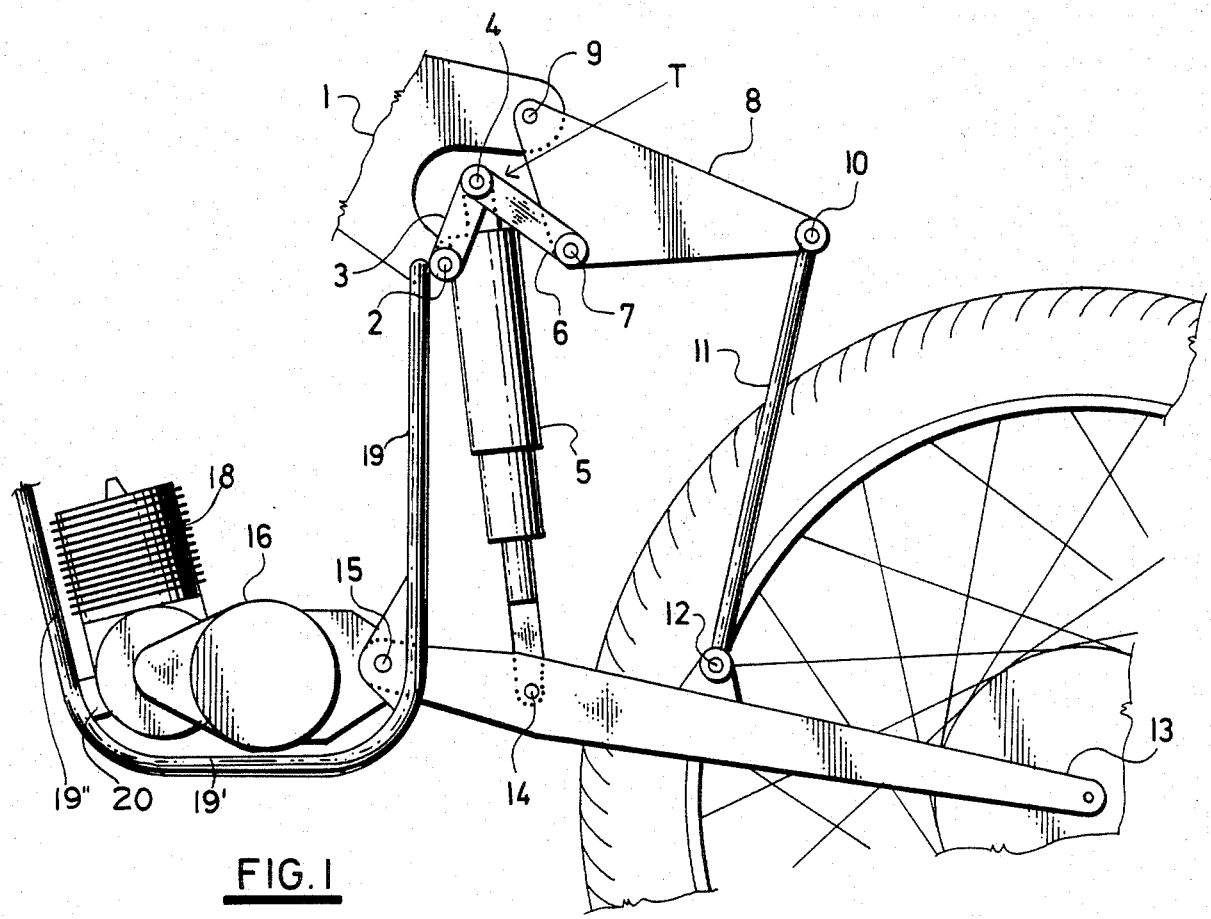

United States Patent [19]

Kreuz

[11] Patent Number: 4,529,056
[45] Date of Patent: Jul. 16, 1985

[54] MECHANISM FOR THE SPRING-CUSHIONING OF A VEHICLE WHEEL

[75] Inventor: Oldrich Kreuz, Vodnany, Czechoslovakia

[73] Assignee: Ceske zavody motocyklove, narodni podnik, Strakonice, Czechoslovakia

[21] Appl. No.: 535,876

[22] Filed: Sep. 26, 1983

[30] Foreign Application Priority Data

Sep. 24, 1982 [CS] Czechoslovakia .................. 6852-82

[51] Int. Cl.³ .............................................. B62K 25/04
[52] U.S. Cl. ..................................... 180/227; 280/284
[58] Field of Search ................ 180/219, 227; 280/283, 280/284, 285, 701

[56] References Cited

U.S. PATENT DOCUMENTS

| 3,977,697 | 8/1976 | MacPike et al. ..................... 280/284 |
| 4,322,088 | 3/1982 | Miyakoshi et al. ................. 180/227 |
| 4,408,674 | 10/1983 | Boyesen ............................... 180/227 |
| 4,457,939 | 7/1984 | Tamaki et al. ....................... 180/227 |

FOREIGN PATENT DOCUMENTS 411696 3/1945 Italy ..................................... 280/284
513889 2/1955 Italy ..................................... 280/284

Primary Examiner—Joseph F. Peters, Jr.
Assistant Examiner—Kenneth R. Rice

[57] ABSTRACT

Spring-cushioning mechanism for a wheel of a vehicle having a frame, said wheel being mounted on an arm which is swingingly mounted on the frame of the vehicle. A lever is mounted adjacent one end thereof to the frame of the vehicle: a rigid strut extends between an intermediate portion of the arm and and the other end of the lever and is pivotally connected at the respective ends thereof to the arm and lever. A springing and damping member is pivoted at one end thereof to a portion of the arm between the pivotal mounting of the arm on the frame and the pivotal connection to the arm of the strut. The mechanism includes a toggle composed of first and second links pivotally connected together at the first ends of the links, the first ends of the links being also pivotally connected to the other end of the springing and damping member. A pivot connects the second end of the first link to the vehicle frame, and a pivot connects the second end of the second link to a portion of the lever intermediate the length thereof. The toggle imposes a variable torque on the lever, and thus a variable thrust upon the rigid strut.

7 Claims, 2 Drawing Figures

MECHANISM FOR THE SPRING-CUSHIONING OF A VEHICLE WHEEL

This invention relates to a mechanism for the spring-cushioning of a vehicle wheel. In a non-limiting preferred embodiment, the vehicle is a motorcycle, the wheel is the rear wheel of the motorcycle, and the wheel is mounted upon a back swinging fork which is supported and cushioned by a springing and damping member disposed between the fork and the frame of the motorcycle.

There have been known embodiments of a back wheel of a motorcycle having one springing and damping member disposed between a back swinging fork and the frame of the motorcycle, usually in the area between the rear of the engine and front part of the back tire and the motorcycle seat. Such known embodiments have had a number of drawbacks, described below.

One of the known embodiments is so designed that its springing and damping member is fixed by its upper end to the motorcycle frame and is directly connected at its lower end to the swinging fork. Another embodiment is so designed that the springing and damping member is fixed at its lower end to the frame of the motorcycle and the upper end is fixed to one end of a two-action lever, the other end of such lever being connected to the swinging fork by means of a rigid strut. The two-action lever is pivotally connected to the frame of the motorcycle. A springing and damping member of another embodiment is fixed at its upper end to the frame and the lower end thereof is fixed to a one-action angle lever, one end of which is swingingly fixed to the swinging fork and the other end of which is swingingly fixed to a pull rod, which is also swingingly fixed to the frame of the vehicle.

All of the above-mentioned prior art embodiments provide a common drawback, viz., they impose a very considerable bending stress upon the back swinging fork at the location of the connection thereto of the springing and damping member, or in the location to which the pull rods or lever are affixed because of a perpendicular component of the force. The back swinging fork must be dimensioned to sustain such stress, and so its design must necessarily be heavier. Another drawback resides in the small working lifts of the springing and damping member; this is inconvenient both for the function and the dimensioning of the spring and damper.

Some of the above-memtioned drawbacks of the prior art are obviated by the mechanism of the present invention for a spring-cushioning of a vehicle wheel, more particularly in the described embodiment of a back wheel of a motorcycle with a swinging fork swingingly seated on the frame of the motorcycle and with a springing and damping member between the back swinging fork and the frame of the motorcycle, the damping and springing member being kinematically connected at its upper end to a lever swingingly seated on the frame of the motorcycle and swingingly connected to the upper end of a rigid strut, the lower end of which is swingingly seated on the swinging fork. The upper end of the swinging and damping member is swingingly connected both to the first end of an arm, the other end of which is revolvingly seated on the frame of the motorcycle, and to the first end of a pull rod, the other end of which is swingingly connected to the lever swingingly mounted on the frame of the motorcycle and connected to the back fork by means of the rigid strut.

The arm and the pull rod function as links of a toggle, the center pivot of which is connected to the upper end of the springing and damping member. The toggle functions to impose a variable torque on the lever, and thus a variable thrust upon the rigid strut depending upon the degree of deflection of the motorcycle wheel with respect to the motorcycle frame.

The swinging connection of the frame to the other end of the arm lying between the frame of the motorcycle and the upper end of the springing and damping member may be formed by means of a frame pin fixed adjustably in a bushing, and this arm may be provided with an adjustable element for changing its length. A pull rod connecting the upper end of the springing and damping member to a lever seated revolvingly on the frame of the motorcycle may also be provided with an adjusting element for changing the length of such pull rod.

The mechanism according to the invention is especially advantageous because of the fact that the back swinging fork is more suitably loaded and less highly stressed in bending by a perpendicular component of the force to which it is subjected; this makes it possible to decrease the weight of the swinging fork. Another advantage of present invention is that beside the good functional properties of the spring-cushioning there is also the possibility of easily adjusting the hardness or resistance of the spring-cushioning throughout a large range. When the invention is applied to cross-country racing motorcycles, the need for a change of the entire springing and damping units is obviated, since an adjustment of their damping changes the function of the springing and damping unit to the necessary degree.

Figure 2:
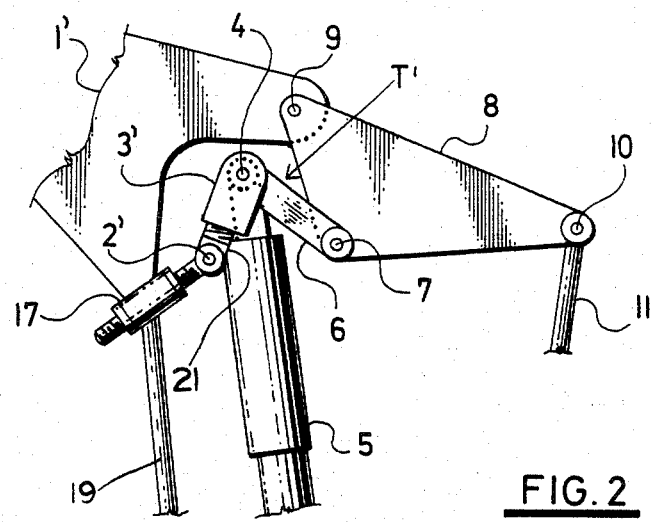

In order that the invention may be clearly understood and readily carried into effect, a preferred embodiment thereof is, by way of example, hereinafter more fully described and illustrated in the accompanying drawings, in which:

FIG. 1 is a schematic view in side elevation of a first embodiment of spring-cushioning of the back wheel of a motorcycle in accordance with the invention, and FIG. 2 is a view in side elevation of a detail of a second embodiment of spring-cushioning of the back wheel of a motorcycle, in accordance with the invention, such embodiment incorporating means for adjusting the degree of prestressing of the damping and springing member of the mechanism.

Turning first to FIG. 1, the fragmentarily shown frame of the motorcycle has an upper part 1, a vertical portion 19 connected thereto, a horrizontal portion 19' connected to the bottom of portion 19, and an upwardly bent portion 19" connected to the forward end of portion 19'. The back swinging fork 13 of the motorcycle, the rear end of which carries the rear wheel of the motorcycle, is pivotally connected to the frame between the parts 19 and 19' of the latter by a pivot pin 15. It will be seen that the engine 18 and the transmission 16 of the motorcycle are supported by and connected to, by means such as shown at 20, the parts 19, 19' and 19" of the frame of the motorcycle.

A triangular lever 8 is connected at its upper forward end to the upper portion 1 of the frame of the motorcycle by a pivot pin 9. Between the rear end of the lever 8 and an intermediate portion of the back swinging fork 13 there is pivotally connected a rigid strut 11, the lower end of strut 11 being connected to the fork 13 by a pivot pin 12 and the upper end of the strut 11 being connected to the lever 8 by a pivot pin 10. It will be seen that as the back swinging fork 13 oscillates with respect to the frame of the motorcycle the lever 8 oscillates with respect thereto about the pin 9. The counterclockwise thrust imposed upon the back swinging fork 13 by the weight of the motorcycle and its rider or riders is opposed by a springing and damping member 5, which may be a McPherson strut, the lower end of which is pivotally connected to the fork 13 generally intermediate between the pivot pins 12 and 15, and the upper end of which is pivotally connected by a pivot pin 4 which functions as the central pivot of a two-link toggle T. Toggle T is made up of an arm or first link 3 pivotally connected to the pin 4 at one end and to the upper frame part 1 at the other end thereof by a pivot pin 2. The other link of the toggle is formed by a link or pull rod 6 which is pivotally connected at one end to the pivot pin 4 and at its other end by a pivot pin 7 to the lower forward corner of the triangular lever 8.

The above-described mechanism functions as follows: when the fork 13 is pivoted upwardly or counterclockwise with respect to the frame of the motorcycle the rigid strut 11 causes the lever 8 likewise to pivot counterclockwise. This pulls the pivot pin 7 and the lower end of the pull rod 6 to the right, thereby increasing the angle between the arm or link 3 and the pull rod or link 6 and thereby pushing the springing and damping member 5 downwardly thereby to increase the clockwise thrust upon the fork 13. A geometrical analysis of the spring-cushioning of the back wheel of the motorcycle reveals that the ratio between the load upon the rear wheel of the motorcycle, that is the counterclockwise torque imposed upon the fork 13 and the clockwise torque imposed upon the fork by the springing and damping member 5 varies in the course of the counterclockwise turning of the fork 13. Because of the action of the toggle T, that is, the fact that as the rear end of the fork 13 lifts the angle between the arm 3 and the pull rod 6 increases, the counter-balancing force imposed upon the fork 3 by the springing and damping member 5 increases at a rate which is less than the rate of increase of the upward thrust imposed upon the rigid strut 11 by the upward or counterclockwise swinging of the fork 13.

The second non-limiting preferred example in accordance with the invention is shown in FIG. 2. Parts in FIG. 2 which are the same as those in FIG. 1 are designated by the same reference characters as in FIG. 1. In the embodiment of FIG. 2, the pin 2', corresponding to the pin 2 in FIG. 1, is adjustably connected to a threaded bushing 17 and an arm 3', which corresponds to the arm 3 in FIG. 1. Arm 3' is provided with an adjusting screw element 21 for changing its effective length. The central pivot pin 4 of the toggle T', the lever 8, the pivot pins 7 and 10, as well as the rigid strut 11 are arranged in the same way as in the embodiment of FIG. 1.

It is evident that not only the arm 3' may be provided with an adjustable length, as shown, but the pull rod 6 may also be provided with an adjustable length. Also the arm 3 and the pull rod 6 may be made so that they can be exchanged readily with corresponding arms and rods of various lengths in order to produce various hardnesses of spring-cushioning, and in this way by means of change of geometric relations without any change of the springing and damping member 5.

In comparison with the hitherto known embodiments referred to above, there is the advantage that toward the end of the lifting of the rear wheel with respect to the frame of the motorcycle, besides the progressive increase of the springing force on the wheel, a ratio between forces affecting the back swinging fork from the springing and damping member and from the rigid strut is advantageously changed; this obviates an excess increase of the bending moment imposed upon the back swinging fork.

It is evident that should the back swinging fork have two arms, some parts such as the rigid strut 11 may also be doubled, and the respective arms or pull rods of the mechanism may also be doubled or forked.

It is evident that the spring-cushioning mechanism of the invention may be applied not only to motorcycles but also to other vehicles as well.

Although the invention is described and illustrated with reference to a preferred embodiment thereof, it is to be expressly understood that it is in no way limited to the disclosure of such preferred embodiment but is capable of numerous modifications within the scope of the appended claims.

I claim:

1. A spring-cushioning mechanism for a wheel of a vehicle having a frame, said wheel being mounted on an arm which is swingingly mounted on the frame of the vehicle, said mechanism comprising a lever pivotally mounted adjacent a first end thereof on the frame of the vehicle, a rigid strut extending between an intermediate portion of the arm and a second end of the lever, the strut being pivotally connected at the respective ends thereof to the arm and the lever, a springing and damping member having first and second ends pivoted at the first end thereof to a portion of the arm between the pivotal mounting of the arm on the frame and the pivotal connection between the arm and the strut, and a toggle means composed of first and second links pivotally connected together at the respective first ends of the links, the first ends of the links being also pivotally connected to the second end of the springing and damping member, pivot means connecting the second end of the first link to the vehicle frame, and pivot means connecting the second end of the second link to a portion of the lever intermediate the length thereof.

2. A mechanism in accordance with claim 1, wherein the springing and damping member is elongated and extends generally parallel to the rigid strut.

3. A mechanism in accordance with claim 2, wherein the rigid strut and the springing and damping member extend generally vertically, and the first, pivotally connected ends of the first and second links are disposed above the second ends of the first and second links which are pivotally connected respectively to the vehicle frame and said intermediate portion of the lever.

4. Mechanism in accordance with claim 1, comprising means for adjusting the point of pivotal attachment to the vehicle frame of the second end of the first link.

5. Mechanism according to claim 4, comprising means for adjusting the length of one of said links.

6. Mechanism according to claim 5, wherein the first link is adjustable in length.

7. Mechanism according to claim 1, wherein the vehicle is a motorcycle, the wheel is the rear wheel of the motorcycle, and the arm is a back springing fork on which the rear wheel of the motorcycle is mounted.

* * * * *